Patented Aug. 26, 1930

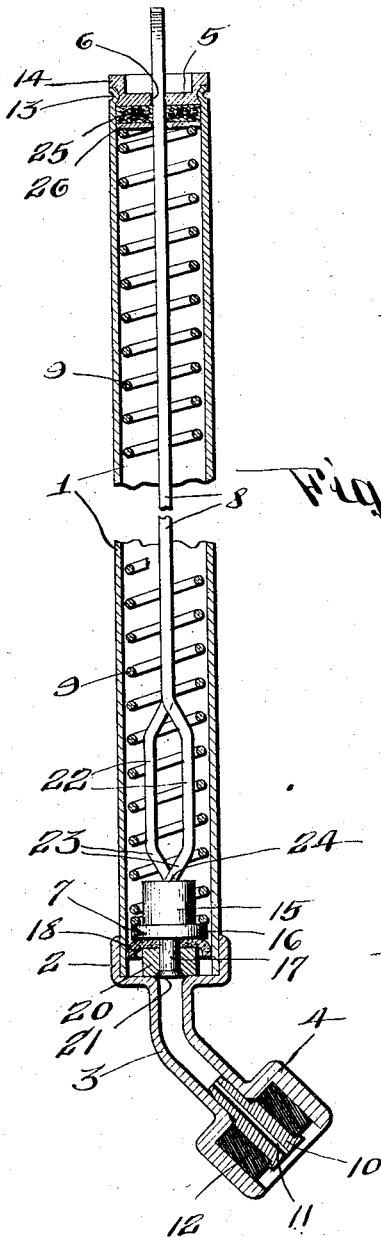

1,774,153

UNITED STATES PATENT OFFICE

PETER W. PFEIFFER, OF SYRACUSE, NEW YORK

TIRE GAUGE

Application filed August 31, 1927. Serial No. 216,688.

This invention relates to pressure gauges particularly gauges for indicating the pressure in pneumatic tires, and has for its object a gauge which is particularly simple and economical in construction and highly efficient and durable in use and also a simple means for holding the indicator member in the position it has been operated by the air pressure.

The invention consists in the novel features and in the combinations and construction hereinafter set forth and claimed.

In describing this invention, reference is had to the accompanying drawings in which like characters designate corresponding parts in all the views.

Figure 1 is a vertical sectional view of this tire gauge.

Figure 2 is a fragmentary elevation of the indicator member.

Figure 3 is a sectional view of the head at the outer end of the gauge and through which the indicator slides.

Figure 4 is a detail view of the rigid washer forming part of the means for holding the indicator member in its operated position.

Figures 5, 6 and 7 are detail views of the parts of the plunger or piston of the gauge.

This gauge comprises, generally, a tubular body having an air inlet at one end, a plunger movable in the body and normally located at the inlet end, an indicator extending lengthwise of the body through the other end of the body and coacting at its inner end with the plunger, means for returning the plunger to its normal position, and means operated by the returning means for holding the indicator in the position it has been operated by the plunger.

1 designates the tubular body having a head 2 at one end provided with an air inlet tube 3 which terminates in an air chuck 4 to be applied to the valve stem of the tire when it is desired to determine the pressure in the tire. 5 is a head closing the other end on the outer end of the tubular body, this having an opening or slot 6 therein.

7 is a plunger or piston slidable in the body and normally located at the inlet end thereof. 8 is the indicator in the form of a blade extending lengthwise of the body and contacting at its inner end with the plunger and being disconnected therefrom, the blade extending through the slot 6. The indicator 8 is provided with suitable graduations to indicate the pressure, the particular graduation indicating the pressure, coming in line with the outer surface of the head 5.

The means for returning the plunger to its normal position at the inner end of the body 1, is a coil spring 9 located within the body encircling the indicator 8, the spring thrusting at one end against the plunger 7 and its other end toward the head 5, and against means for holding the indicator 8 in its operated position. This means being interposed between the end of the spring and the head 5.

The head 2 is in the form of a cup in which the contiguous end of the tubular body is snugly fitted without screw threads. The head 2 of the air chuck and tube 3 are an integral structure. The air chuck consists of a metal plug 10 having a lengthwise passage 11, the plug being driven into the tube 3 and having a snug fit therewith so that the screw threads are not required. The plug 10 is surrounded by compressible sealing block or plug 12 of yielding material as rubber.

The head 5 is preferably interlocked with the outer end of the body and is here illustrated as formed with an annular groove in which is snugly fitted an annular corrugation or internal bead 13 on the tubular body 1. The end of the tubular body thrusts against a flange or shoulder 14 on the head 5.

The plunger 7 comprises a body or head 15 having an annular shoulder 16 and a stem 17 extending beyond the shoulder, a packing disk 18 on the stem and a head or thickened washer 20, the end of the stem 17 being spread into a countersink 21 in the head or washer 20, and thus holding all the parts of the plunger 7 together. The disk 18 is of greater diameter than the head 15 and the internal diameter of the body 1 in order to fold over the head or washer 20 when the plunger is fitted into the body 1, and thus form a piston packing.

The indicator 8 is in the form of a flat blade and is provided with a bifurcate portion preferably located at one end, the bifurcations 22 being expanded in opposite directions forming an enlargement by means of which the indicator is prevented from undue lateral displacement within the body 1 or coil spring 9. In other words the enlargement tends to hold the indicator blade centered. The end of the bifurcations are bent inwardly as in 23 so that their edges are not in line, and these end edges contact at 24 with the end of the plunger 7.

The means operated by the spring 9 for holding the indicator in its operated position regardless of the position of the plunger 8, comprises a washer 25 of compressible material as felt arranged adjacent the inner face of the head 5 and being of sufficient diameter to fit the internal body 1, and a metal washer 26 thrusting against the washer 25. The spring 9 thrusts against the washer 26. The washers 25 and 26 are formed with slots through which the indicator 8 extends, these slots being in line with slot 6 at the head 5. The washer 25 being of a compressible material, and being confined by the head 5, washer 26, and walls of tubular body 1, tends to close the slot therein when the spring 9 is under pressure, and hence acts as a friction brake on the blade 8 to hold it in its operated position.

In operation, the air chuck is applied to the valve stem of the tire and the air pressure passes through the tube 3 against the plunger and forces the plunger toward the outer end of the body 1 against the action of the returning spring 9 and in so doing forces the indicator outward during the compression of the coil spring 9. During the compression of the spring the felt washer is compressed and the walls of the slot therein contract on the indicating member so that when the gauge is removed from the valve stem of the tire, the indicator will remain in its operated position although the plunger 7 is returned to its starting position under the influence of the spring 9. The operator takes the reading from the graduation on the blade in line with the outer edge of the head 5. The bifurcations of the indicator 8 together with the slots in the head 5 and washers 25 and 26 hold the blade centered and the bifurcations in particular hold the inner end of the indicator from undue lateral displacement.

What I claim is:

1. A tire gauge comprising a tubular body having an air inlet at one end, a plunger movable in the body and normally located at the inlet end, the body having a head at the other end formed with a slot, an indicator extending lengthwise of the body and normally coacting at one end against the plunger and extending at its other end through the slot, the indicator being in the form of a blade having a bifurcated portion, bifurcations of which extend in opposite directions providing the blade with an enlargement.

2. A tire gauge comprising a tubular body having an air inlet at one end, a plunger movable in the body and normally located at the inlet end, the body having a head at its other end formed with a slot, an indicator extending lengthwise of the body and normally coacting at one end against the plunger and extending at its other end through the slot, the indicator being in the form of a blade having a bifurcated portion, the bifurcations of which extend in opposite directions providing the blade with an enlargement, said bifurcations being located at the end of the blade adjacent the plunger and the ends of the bifurcations extending toward each other to contact with the plunger, and a returning spring within the body and encircling the indicator, the spring thrusting against the plunger.

In testimony whereof, I have hereunto signed my name at Syracuse, in the county of Onondaga and State of New York, this 30th day of August, 1927.

PETER W. PFEIFFER.